J. D. HARRIS AND T. M. DALGARN.
RADIATOR FOR MOTOR VEHICLES.
APPLICATION FILED APR. 22, 1921.
1,432,461. Patented Oct. 17, 1922.
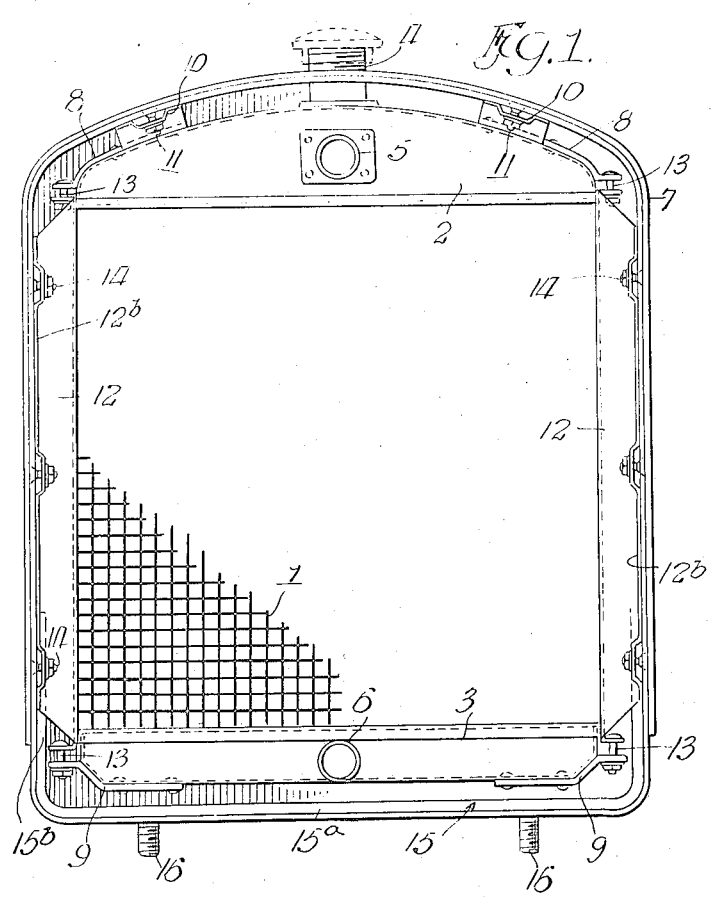
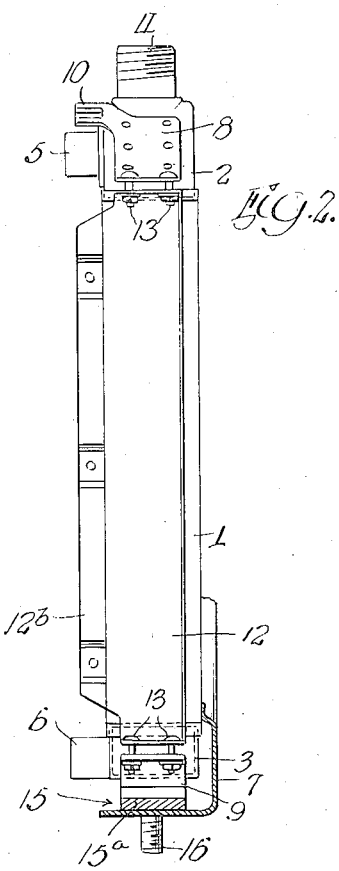
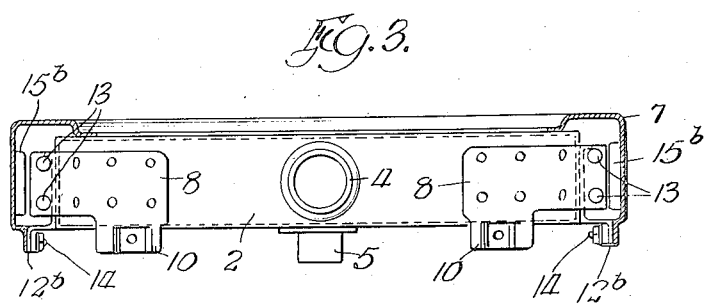
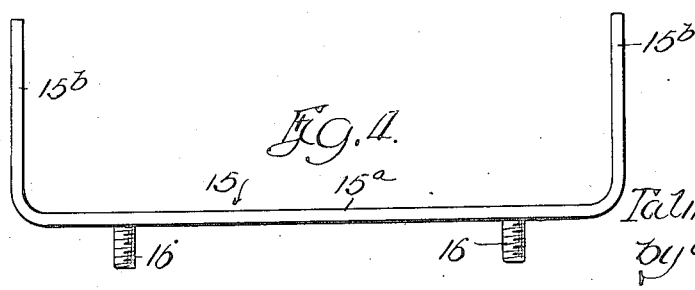
Inventors
Joseph D. Harris
Talmadge M. Dalgarn Patented Oct. 17, 1922.

1,432,461

UNITED STATES PATENT OFFICE.

JOSEPH D. HARRIS AND TALMADGE M. DALGARN, OF DETROIT, MICHIGAN.

RADIATOR FOR MOTOR VEHICLES.

Application filed April 22, 1921. Serial No. 463,562.

*To all whom it may concern:*

Be it known that we, JOSEPH D. HARRIS and TALMADGE M. DALGARN, both citizens of the United States, and both residing at Detroit, in the county of Wayne and State of Michigan, have invented new and useful Improvements in Radiators for Motor Vehicles, of which the following is a specification.

This invention relates to radiators for motor vehicles, such as automobiles, tractors, and the like, and consists in the matters hereinafter described and more particularly set forth in the appended claims.

In the accompanying drawings—

Fig. 1 is a rear view of a radiator embodying the features of our invention;

Fig. 2 is a side view of the radiator with upper portion of the outer casing or shell broken away and the lower portion thereof in vertical section;

Fig. 3 is a top plan view of the radiator with the casing or shell in horizontal section; and Fig. 4 is a side view of a detail of construction to be hereinafter described.

The radiator shown in Fig. 1 comprises a core 1, illustrated in conventional form and having such design as desired in conformity with radiator construction. This core, through which the cooling water circulates, is located between the upper and lower tanks 2, 3, the core being soldered to said tanks, as usual. The upper tank 2 has a filling neck 4 closed by a cap, as customary, and also has an inlet opening 5 at the rear, as shown. The lower tank 3 has an outlet opening 6 also at the rear, and the assembled core and tanks are located in an outer casing or shell 7, of any conventional design adapted for the particular shape and design of the assembled core and tank structure.

Secured to the top wall of the upper tank 2 are two brackets 8, 8, one adjacent each end of the tank, as shown in Figs. 1 and 3, and secured in similar arrangement to the under side of the bottom wall of the lower tank 3, are two brackets 9, 9. These brackets are rigidly secured to their respective tanks by rivets, as shown, and the upper brackets each have an upwardly offset and rearwardly extending lug 10 to engage against the under side of the top portion of the shell 7 over the upper tank and secured thereto by a bolt 11, as shown in Fig. 1.

On opposite sides of the core 1 are vertically arranged bolting strips 12, 12, one at each side of the core, and extending between the brackets 8, 9, as shown. The brackets and strips have adjacent outwardly projecting flanges or lugs, by which bolts 13 may clamp the same together, in the manner and for the purpose described and claimed in our copending application filed April 22, 1921, Serial No. 463,561. The strips 12 have flanges 12$^b$ to engage against the inside of the vertical side portions of the shell 7 and be secured thereto by bolts 14 for clamping the assembled core and tank structure in the shell 7. This connection between the strips 12 and the shell 7 together with the connection between the top portion of the shell and the lugs 10 of the upper brackets, suspends the core and tank structure in the shell 7, and thus throws the weight of such structure and load of the water carried thereby directly on the shell and not on the chassis on which the complete radiator is mounted.

To anchor the shell 7 to the chassis (not shown) without having a direct connection between the core and tank structure and the chassis, we employ a substantially U-shaped bar 15, as shown in Fig. 4. This bar has a horizontally straight mid-portion 15$^a$ which extends under the lower tank 3 and clear across the same, as illustrated in Fig. 1. Such portion of said bar is spaced downward from the under side of the lower tank 3 and rests on the lower portion of the shell. Said bar has a number of depending threaded studs 16, 16 secured to it and extending through the bottom of the shell and by which attachment is made to the chassis (not shown). This mid-portion 15$^a$ extends into integral upright portions 15$^b$, which extend into the shell 7 along the sides thereof.

By the construction described, the side bolting strips 12 may, before being applied in place or on being removed, expose the sides of the core and the ends of the tanks so that leaks at such points may be readily reached and soldered, as clearly set forth in our copending application. With the provision of the anchoring bar 15, the assembled core and tanks may be suspended in the shell without having a direct connection with the chassis, as described in said copending application.

We claim as our invention:

1. A radiator for motor vehicles, comprising a core, an outer shell surrounding said core, means connecting said core to said shell to suspend the same therein, an anchor bar located in said shell below said core and engaged with said shell, and anchoring studs secured to said bar and projecting downward therefrom through said shell.

2. A radiator for motor vehicles, comprising upper and lower tanks, a core between and secured to said tanks, brackets secured to said tanks, strips at the sides of said core and extending between said brackets, means connecting the ends of said strips to said brackets, an outer shell surrounding the assembled core and tanks, means connecting said strips to the sides of said shell to suspend the assembled core and tanks therein, an anchor bar below said lower tank, and anchor studs secured to said bar and projecting downward therefrom through the portion of the shell therebelow.

3. A radiator for motor vehicles, comprising upper and lower tanks, a core between and secured to said tanks, brackets secured to said tanks, strips at the sides of said core and extending between said brackets, means connecting the ends of said strips to said brackets, an outer shell surrounding the assembled core and tanks, means connecting said strips to the sides of said shell to suspend the assembled core and tanks therein, an anchor bar below said lower tank and extending the full length of the same and having upright end portions extending into said shell along the sides of said core, and anchor studs secured to said bar and projecting downward therefrom through the portion of the shell therebelow.

In testimony that we claim the foregoing as our invention, we affix our signatures, this fourteenth day of April, A. D. 1921.

JOSEPH D. HARRIS.
TALMADGE M. DALGARN.